US010296918B1

(12) United States Patent
Cohen

(10) Patent No.: US 10,296,918 B1
(45) Date of Patent: May 21, 2019

(54) PROVIDING RISK ASSESSMENTS TO COMPROMISED PAYMENT CARDS

(71) Applicant: EMC Corporation, Hopkinton, MA (US)

(72) Inventor: Daniel T. Cohen, Even Yehuda (IL)

(73) Assignee: EMC IP Holding Company LLC, Hopkinton, MA (US)

(*) Notice: Subject to any disclaimer, the term of this patent is extended or adjusted under 35 U.S.C. 154(b) by 348 days.

(21) Appl. No.: 14/662,372

(22) Filed: Mar. 19, 2015

(51) Int. Cl.
  *G06Q 10/00* (2012.01)
  *G06Q 30/00* (2012.01)
  *G06Q 40/00* (2012.01)

(52) U.S. Cl.
  CPC ......... *G06Q 30/0185* (2013.01); *G06Q 40/12* (2013.12)

(58) Field of Classification Search
  CPC .... G06Q 30/0185; G06Q 40/12; G06Q 10/00; G06F 21/00
  USPC ...................................... 705/30, 52; 726/25
  See application file for complete search history.

(56) References Cited

U.S. PATENT DOCUMENTS

| 5,884,289 | A * | 3/1999 | Anderson | G06Q 20/105 |
| | | | | 235/380 |
| 6,988,657 | B1 * | 1/2006 | Singer | G06Q 20/0855 |
| | | | | 235/380 |
| 7,668,776 | B1 | 2/2010 | Ahles | |
| 8,499,355 | B1 * | 7/2013 | Goncharov | G06F 21/44 |
| | | | | 726/25 |
| 8,600,872 | B1 * | 12/2013 | Yan | G06Q 40/02 |
| | | | | 705/35 |
| 8,626,663 | B2 | 1/2014 | Nightengale et al. | |
| 8,739,290 | B1 * | 5/2014 | Jamail | G06F 11/0709 |
| | | | | 726/25 |
| 8,756,100 | B1 * | 6/2014 | Yanacek | G06Q 30/0223 |
| | | | | 705/14.24 |
| 8,839,449 | B1 * | 9/2014 | Dotan, III | G06F 21/552 |
| | | | | 713/189 |
| 8,862,526 | B2 | 10/2014 | Miltonberger | |
| 8,983,868 | B1 * | 3/2015 | Sehrer | G06Q 20/3224 |
| | | | | 705/1.1 |
| 9,038,177 | B1 * | 5/2015 | Tierney | H04L 63/1408 |
| | | | | 709/224 |
| 9,392,008 | B1 * | 7/2016 | Michel | H04L 63/1416 |
| 9,563,870 | B1 * | 2/2017 | Szmajda | G06Q 10/087 |

(Continued)

*Primary Examiner* — Oluseye Iwarere
(74) *Attorney, Agent, or Firm* — BainwoodHuang

(57) ABSTRACT

A computer-implemented technique provides a compromised payment card risk assessment. The technique involves gathering, by processing circuitry, compromised payment card data. The technique further involves identifying, by the processing circuitry, a set of compromised payment cards from the compromised payment card data. The technique further involves providing, in response to identifying the set of compromised payment cards and by the processing circuitry, a compromised payment card assessment report which includes a set of payment card entries corresponding to the set of compromised payment cards. Each payment card entry includes (i) identification data which identifies a respective compromised payment card and (ii) a score which indicates an estimated likelihood that the respective compromised payment card will actually be used for fraud. Such scores may be based on summations of different sub-scores and serve as overall numerical measures of risk.

12 Claims, 7 Drawing Sheets

(56) References Cited

U.S. PATENT DOCUMENTS

| | | | | |
|---|---|---|---|---|
| 2002/0133467 | A1* | 9/2002 | Hobson | G06Q 20/02 705/64 |
| 2004/0039686 | A1* | 2/2004 | Klebanoff | G06Q 20/10 705/38 |
| 2004/0225628 | A1* | 11/2004 | Aoki | G06Q 20/10 706/45 |
| 2005/0055373 | A1* | 3/2005 | Forman | G06Q 20/4016 |
| 2008/0015978 | A1* | 1/2008 | Curry | G06Q 40/025 705/38 |
| 2009/0043640 | A1* | 2/2009 | Sutton | G06Q 10/0639 705/7.34 |
| 2010/0116887 | A1* | 5/2010 | Barkan | G06K 7/10722 235/440 |
| 2010/0169192 | A1* | 7/2010 | Zoldi | G06Q 40/12 705/30 |
| 2011/0016471 | A1* | 1/2011 | Shah | G06F 17/30864 718/104 |
| 2011/0041055 | A1* | 2/2011 | Heute | G06F 17/2288 715/243 |
| 2011/0314557 | A1* | 12/2011 | Marshall | G06Q 30/0241 726/27 |
| 2012/0109854 | A1* | 5/2012 | Thomas | G06Q 20/042 705/500 |
| 2012/0158590 | A1* | 6/2012 | Salonen | G06Q 10/02 705/44 |
| 2012/0278741 | A1* | 11/2012 | Garrity | G06Q 10/10 715/760 |
| 2013/0024525 | A1* | 1/2013 | Brady | G06Q 10/08 709/206 |
| 2013/0085804 | A1* | 4/2013 | Leff | G06O 30/0219 705/7.29 |
| 2013/0185277 | A1* | 7/2013 | Hampole | G06F 17/3089 707/711 |
| 2014/0019267 | A1* | 1/2014 | Stoliartchouk | G06Q 30/0277 705/14.73 |
| 2014/0019307 | A1* | 1/2014 | Guardalben | G06Q 30/0641 705/27.1 |
| 2014/0122325 | A1* | 5/2014 | Zoldi | G06Q 20/4016 705/39 |
| 2014/0128153 | A1* | 5/2014 | Driemeyer | A63F 13/00 463/25 |
| 2014/0297750 | A1* | 10/2014 | Shimada | H04L 51/32 709/204 |
| 2015/0026027 | A1* | 1/2015 | Priess | G06Q 40/00 705/35 |
| 2015/0046281 | A1* | 2/2015 | Shivaswamy | G06Q 30/0631 705/26.7 |
| 2015/0073981 | A1* | 3/2015 | Adjaoute | G06Q 30/0225 705/39 |
| 2015/0206416 | A1* | 7/2015 | Marra | G08B 21/24 340/539.32 |
| 2015/0348042 | A1* | 12/2015 | Jivraj | G06Q 20/4016 705/44 |
| 2016/0171499 | A1* | 6/2016 | Meredith | G06Q 20/3224 705/44 |
| 2016/0217470 | A1* | 7/2016 | Gerard | G06Q 20/1085 |
| 2016/0358268 | A1* | 12/2016 | Verma | G06F 17/30463 |
| 2016/0364727 | A1* | 12/2016 | DeLawter | G06Q 20/4016 |
| 2017/0053115 | A1* | 2/2017 | Healy | G06F 21/552 |

\* cited by examiner http://www.paymentcardmarketplace.com/cards-for-sale/page-5

Welcome to Payment Card Marketplace

Compromised Payment Cards For Sale

| Item # | Card Number (Remaing Digits Hidden) | Card Expiration Date | Card Owner (Last Name Hidden) | Zip Code | Acquisition Date | Social Security Number (if avail) | Date of Birth | Other | Cost | Add to Cart |
|---|---|---|---|---|---|---|---|---|---|---|
| 51 | 123456 ****** ****** | 11/19 | John ******* | 01234 | 01-24-15 | XXX-XX-7890 | March 31, 1951 | ... | $1.50 | Buy |
| 52 | 123456 ****** ****** | 11/20 | Mary ******* | 01234 | 01-24-15 | XXX-XX-6789 | April 15, 1950 | ... | $1.50 | Buy |
| 53 | 123456 ****** ****** | 10/16 | Mike ******* | 01235 | 01-24-15 | XXX-XX-1234 | January 1, 1962 | ... | $1.50 | Buy |
| 54 | 123456 ****** ****** | 07/18 | Jane ******* | 01235 | 01-24-15 | XXX-XX-2345 | May 21, 1951 | ... | $1.50 | Buy |
| 55 | 123456 ****** ****** | 07/18 | Dave ******* | 01234 | 01-24-15 | XXX-XX-5678 | August 8, 1980 | ... | $1.50 | Buy |
| 56 | 123478 ****** ****** | 08/18 | Hank ******* | 01397 | 02-24-15 | XXX-XX-1122 | November 4, 1988 | ... | $2.25 | Buy |
| 57 | 123481 ****** ****** | 01/21 | Gary ******* | 29255 | 12-31-14 | XXX-XX-4455 | January 5, 1972 | ... | $1.35 | Buy |
| 58 | 123481 ****** ****** | 05/21 | Anne ******* | 29255 | 11-28-14 | XXX-XX-6677 | June 23, 1978 | ... | $1.35 | Buy |
| 59 | 123481 ****** ****** | 06/20 | Paul ******* | 29254 | 02-15-15 | XXX-XX-3434 | October 7, 1948 | ... | $1.35 | Buy |
| 60 | 123577 ****** ****** | 02/19 | Kate ******* | 11223 | 02-01-15 | XXX-XX-8989 | March 28, 1967 | ... | $1.85 | Buy |

< Page 3 4 5 6 7 >

Check Out

FIG. 3

| | Card Identifier Field 292 | Compromised Payment Card Data Field 294 Containing Compromised Payment Card Data 30 to Uniquely Identify A Particular Compromised Payment Card 34 | | | | | | Overall Score Field 296 |
|---|---|---|---|---|---|---|---|---|
| 282(1) | 007189 | 123456 ****** ****** | 11/19 | John ******* | 01234 | 01-24-15 | XXX-XX-7890 | March 31, 1951 | ... | 7456 |
| 282(2) | 007190 | 123456 ****** ****** | 11/20 | Mary ******* | 01234 | 01-24-15 | XXX-XX-6789 | April 15, 1950 | ... | 2391 |
| 282(3) | 007191 | 123456 ****** ****** | 10/16 | Mike ******* | 01235 | 01-24-15 | XXX-XX-1234 | January 1, 1962 | ... | 4567 |
| | 007192 | 123456 ****** ****** | 07/18 | Jane ******* | 01235 | 01-24-15 | XXX-XX-2345 | May 21, 1951 | ... | 4508 |
| | 007193 | 123456 ****** ****** | 07/18 | Dave ******* | 01234 | 01-24-15 | XXX-XX-5678 | August 8, 1980 | ... | 6597 |
| ... | ... | ... | | | | | | | |

FIG. 6

PROVIDING RISK ASSESSMENTS TO COMPROMISED PAYMENT CARDS

BACKGROUND

Over the past few years, the cybercrime marketplace has matured to a point where attacks (such as phishing or distributed denial of service) are offered as services and the compromised data resulting from said attacks is available as a commodity. Similarly, compromised credit card information can be seen in the hundreds of "Credit Card Stores" (or "CC Stores") that have developed to support the selling of the credit cards. At any given moment hundreds of thousands—if not millions—of credit cards are offered for sale in the cybercrime marketplace for as low as one or two US Dollars. The stores' "stock" of credit cards is constantly replenished, sourced mainly from large botnets or from Point-of-Sale compromises/breaches.

SUMMARY

Traditional mitigation involved sending digital lists of the identified compromised credit cards to the targeted financial institution. Considering the growing number of compromised credit cards in circulation, there is a need to provide a "risk score" against each compromised credit card—what is the probability of a compromised credit card actually being used for fraud. This will allow the response/mitigation (by the financial institution) to be prioritized.

This invention addresses that need and presents techniques to assess the described risk levels. In particular, improved techniques are directed to providing risk assessments to compromised payment cards. The risk assessments (e.g., risk scores) provide measures of how likely the compromised payment cards will be used for fraud. Such risk assessments may be based on monitoring compromised payment card offerings at malicious payment card marketplaces (e.g., online store fronts which sell stolen payment card data). Accordingly, banks (or other payment card processing companies) may be able to rank the compromised payment cards based on the risk assessments, and take action on the highest ranked compromised payment cards. As a result, a bank does to not need to take a wait-and-see approach if the bank does not have enough resources to proactively replace all of the compromised payment cards. Rather, the bank is able to channel its attention and resources to the compromised payment cards which are deemed riskiest.

One embodiment is directed to a computer-implemented method of providing a compromised payment card risk assessment. The method includes gathering compromised payment card data. The method further includes identifying a set of compromised payment cards from the compromised payment card data. The method further includes providing, in response to identifying the set of compromised payment cards, a compromised payment card assessment report which includes a set of payment card entries corresponding to the set of compromised payment cards. Each payment card entry includes (i) identification data which identifies a respective compromised payment card (e.g., part of the payment card number, part of the owner's name, address information, etc.) and (ii) a score which indicates an estimated likelihood that the respective compromised payment card will actually be used for fraud. Such scores may be based on summations of different sub-scores and serve as overall numerical measures of risk.

In some arrangements, gathering the compromised payment card data includes collecting compromised payment card inventories from an online store at different collection times. Here, the processing circuitry harvests stolen payment card data from an online store front or marketplace by routinely posing as a legitimate purchaser and capturing as much stolen payment card information as possible, e.g., by scraping/crawling through listings of stolen payment cards.

In some arrangements, identifying the set of compromised payment cards from the compromised payment card data includes performing comparison operations between the compromised payment card inventories which were collected from the online store at the different times and identifying which compromised payment cards were sold by the online store based on results of the comparison operations. Detection of a compromised payment card which was available for purchase but which has now disappeared from the online store may indicate that the compromised payment card has been purchased and will be used imminently.

In some arrangements, providing the compromised payment card assessment report includes identifying a set of trends in purchases of the compromised payment cards which were sold by the online store, and generating, as the score of each payment card entry included in the compromised payment card assessment report, a numerical value based on the set of trends in the purchases of the compromised payment cards. The numerical value serves as a measure of how likely the respective compromised payment card identified by the identification data of that payment card entry will be used for fraud.

In some arrangements, providing the compromised payment card assessment report includes identifying a location trend in purchases of the compromised payment cards which were sold by the online store, and generating a respective location sub-score for each payment card entry included in the compromised payment card assessment report. The respective location sub-score is based on a correlation strength between a location identified by the identification data of that payment card entry and the location trend identified in the purchases of the compromised payment cards which were sold by the online store.

In some arrangements, providing the compromised payment card assessment report includes identifying a card organization trend in purchases of the compromised payment cards which were sold by the online store, and generating a respective card organization sub-score for each payment card entry included in the compromised payment card assessment report. The respective card organization sub-score is based on a correlation strength between a card organization identified by the identification data of that payment card entry and the card organization trend identified in the purchases of the compromised payment cards which were sold by the online store.

In some arrangements, providing the compromised payment card assessment report includes identifying a card age trend in purchases of the compromised payment cards which were sold by the online store, and generating a respective card age sub-score for each payment card entry included in the compromised payment card assessment report. The respective card age sub-score is based on a correlation strength between a card age (i.e., how long has it been posted on the store) and the card age trend identified in the purchases of the compromised payment cards which were sold by the online store.

In some arrangements, providing the compromised payment card assessment report includes identifying a bank number trend in purchases of the compromised payment cards which were sold by the online store, and generating a respective bank number sub-score for each payment card entry included in the compromised payment card assessment report. The respective card bank number sub-score is based on a correlation strength between a bank number identified by the identification data of that payment card entry and the bank number trend identified in the purchases of the compromised payment cards which were sold by the online store.

In some arrangements, providing the compromised payment card assessment report includes identifying a card source trend in purchases of the compromised payment cards which were sold by the online store, and generating a respective card source sub-score for each payment card entry included in the compromised payment card assessment report. The respective card source sub-score is based on a correlation strength between a card source identified by the identification data of that payment card entry and the card source trend identified in the purchases of the compromised payment cards which were sold by the online store.

In some arrangements, providing the compromised payment card assessment report includes identifying, in purchases of the compromised payment cards which were sold by the online store, (i) a location trend, (ii) a card organization trend, (iii) a card age trend, (iv) a bank number trend, and (v) a card source trend, and generating (i) a location sub-score, (ii) a card organization sub-score, (iii) a card age sub-score, (iv) a bank number sub-score, and (v) a card source sub-score for each payment card entry included in the compromised payment card assessment report. Such providing further includes aggregating the sub-scores for each payment card entry to form, for that payment card entry, the score which indicates the estimated likelihood that the respective compromised payment card will actually be used for fraud.

Another embodiment is directed to an electronic apparatus which includes a communications interface, memory, and control circuitry coupled to the communications interface and the memory. The memory stores instructions which, when carried out by the control circuitry, cause the control circuitry to:
  (A) gather compromised payment card data through the communications interface,
  (B) identify a set of compromised payment cards from the compromised payment card data, and
  (C) in response to identifying the set of compromised payment cards, provide a compromised payment card assessment report which includes a set of payment card entries corresponding to the set of compromised payment cards, each payment card entry including (i) identification data which identifies a respective compromised payment card and (ii) a score which indicates an estimated likelihood that the respective compromised payment card will actually be used for fraud.

Yet another embodiment is directed to a computer program product having a non-transitory computer readable medium which stores a set of instructions to provide a compromised payment card risk assessment. The set of instructions, when carried out by computerized circuitry, causes the computerized circuitry to perform a method of:
  (A) gathering compromised payment card data;
  (B) identifying a set of compromised payment cards from the compromised payment card data; and
  (C) in response to identifying the set of compromised payment cards, providing a compromised payment card assessment report which includes a set of payment card entries corresponding to the set of compromised payment cards, each payment card entry including (i) identification data which identifies a respective compromised payment card and (ii) a score which indicates an estimated likelihood that the respective compromised payment card will actually be used for fraud.

It should be understood that, in the cloud context, certain electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing a compromised payment card risk assessment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is an example view of an online store front which sells compromised payment cards.

FIG. 6 is an example compromised payment card assessment report which is provided by the electronic apparatus of FIG. 2.

DETAILED DESCRIPTION

An improved technique is directed to providing risk assessments to compromised payment cards. The risk assessments (e.g., risk scores) provide numerical measures of how likely the compromised payment cards will be used for fraud. Such risk assessments may be based on monitoring compromised payment card offerings at malicious payment card marketplaces (e.g., online store fronts which sell stolen payment card data). As a result, payment card processing companies (e.g., banks, credit card companies, transaction clearing houses, other financial institutions, etc.) may be able to rank the compromised payment cards based on the risk assessments, and take action on the highest ranked compromised payment cards. Thus, a payment card processing company does to not need to take a wait-and-see approach if the company does not have enough resources to proactively replace all of the compromised payment cards. Rather, the company can focus its attention and resources on the compromised payment cards which are deemed most risky.

Figure 1:
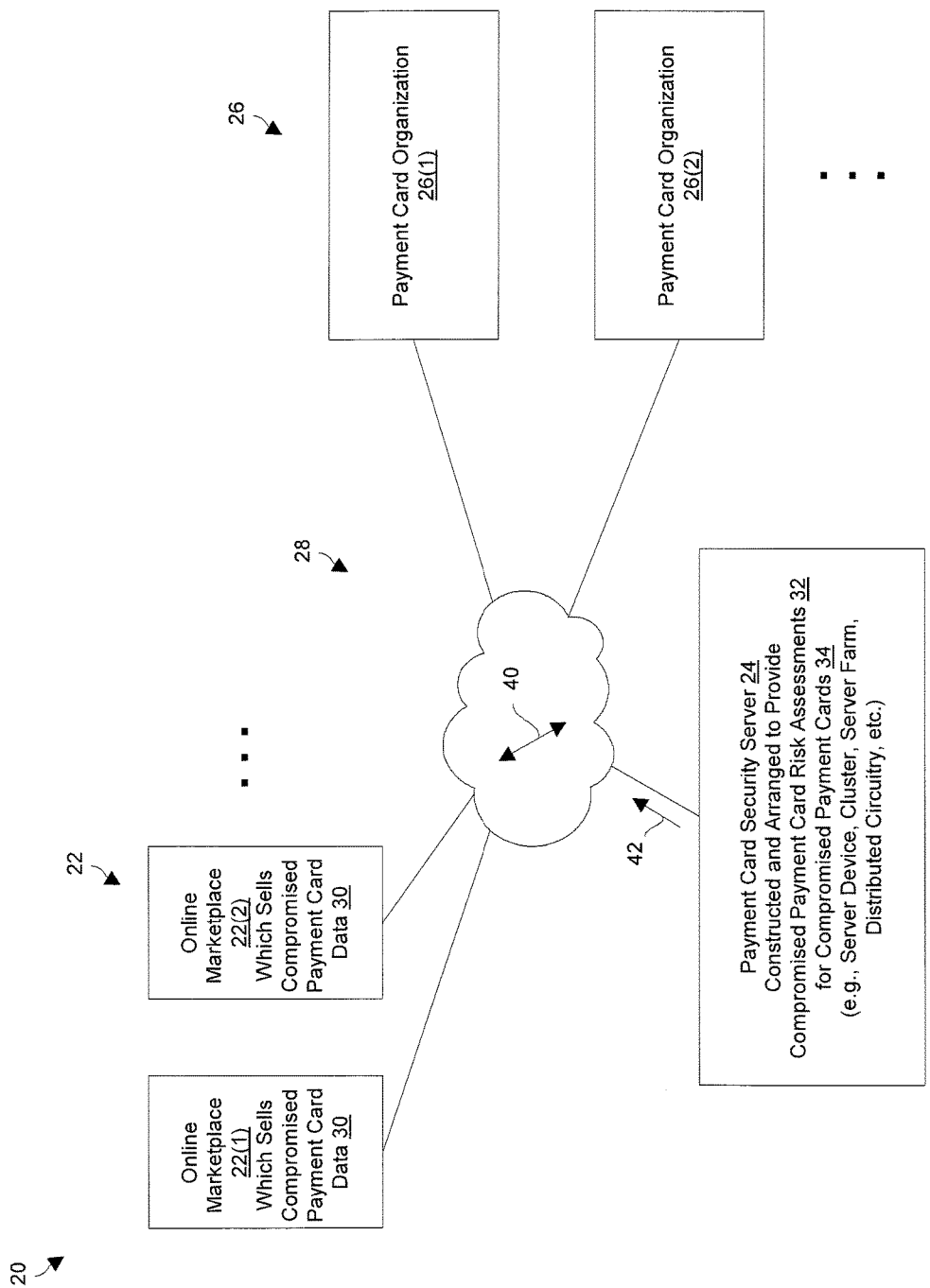
FIG. 1 is a block diagram of an electronic environment which is suitable for providing a compromised payment card risk assessment.

FIG. 1 shows an electronic environment 20 which is suitable for providing a compromised payment card risk assessment. The electronic environment 20 includes online marketplaces 22(1), 22(2), . . . (collectively, online marketplaces 22), a payment card security server 24, payment card organizations 26(1), 26(2), . . . (collectively, payment card organizations 26), and a communications medium 28.

The online marketplaces 22 are malicious online store fronts which sell compromised payment card data 30. Along these lines, a legitimate merchant may suffer a breach in security in which the credit card information of many credit card customers is stolen. For example, a rogue or disgruntled employee of the legitimate merchant may steal the credit card information from the merchant's database and offer the stolen credit card information for sale through one of the online marketplaces 22. As another example, the legitimate merchant may be infected with malware which gathers credit card information from the merchant's database. As yet another example, the legitimate merchant may be hacked electronically by a remote computer which steals the credit card information from the merchant's database, and so on.

The payment card security server 24 is constructed and arranged to provide compromised payment card risk assessments 32. In particular, the payment card security server 24 may be operated by a trusted third party whose task it is to probe malicious store fronts and gather as much cybercrime data as possible. The trusted third party then utilizes the gathered cybercrime data to prevent future cybercrime from taking place. Along these lines, the trusted third party operates the payment card security server 24 to provide respective risk scores for compromised payment cards 34. Each risk score serves as a numerical measure of riskiness that a corresponding compromised payment card 34 will be used for fraud.

The payment card organizations 26 conduct business using payment cards 34. Such organizations 26 may include merchants that sell products and services using payment cards 34, banks that provide payments to the merchants and then bill the owners of the payment cards 34, payment card companies or clearing houses, and so on. Such organizations receive the payment card risk assessments 32 from the payment card security server 24 and then are able to take remedial action based on the payment card risk assessments 32 of the compromised payment cards 34. For example, a payment card organization 26 can contact the owners of the compromised payment cards 34 and/or replace the compromised payment cards which are deemed the most risky. Accordingly, even if it is not cost effective for a payment card organization 26 to replace all of the cards 34 from a security breach, the payment card organization 26 may be able to apply resources to replace the top X % of compromised payment cards 34 which are deemed most risky (e.g., the highest ranked 5%, the top 10%, the top 20%, etc.).

The communications medium 28 is constructed and arranged to connect the various components of the electronic environment 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic communications devices and cabling, wireless communications devices, combinations thereof, etc. Furthermore, the communications medium 28 is capable of supporting LAN-based communications, SAN-based communications, cellular communications, combinations thereof, etc.

During operation, the payment card security server 24 collects compromised payment card data 30 from as many sources as possible. Along these lines, the payment card security server 24 routinely shops or "surfs" the online marketplaces 22 which sell compromised payment card data 30. Such compromised payment card data 30 is confidential personal information which has been taken from payment card owners by a malicious entity. Eventually, such compromised payment card data 30 may be purchased from one of the online marketplaces 22 and used in a fraudulent transaction.

As the payment card security server 24 navigates among and within the online marketplaces 22 (e.g., crawls among pages of compromised payment card data 30 for sale), the payment card security server 24 collects as much compromised payment card data 30 as possible (e.g., scrapes the online marketplaces 22 for compromised payment card data 30). These inventories of gathered compromised payment card data 30 are then stored for later evaluation. In particular, at some time in the future (e.g., the next hour, the next day, the next week, etc.), the payment card security server 24 navigates among and within the online marketplaces 22 again to collect new inventories of gathered compromised payment card data 30.

The payment card security server 24 then compares inventories to identify which compromised payment card data 30 has been purchased. That is, once particular compromised payment card data 30 has been sold, the online marketplaces 22 removes that compromised payment card data 30 from the store front so that it cannot be repurchased. Accordingly, it can be concluded that any compromised payment card data 30 that is no longer for sale has been purchased and will be used imminently for a fraudulent transaction.

The payment card security server 24 then identifies trends in the compromised payment card data 30 that has been purchased. Along these lines, a purchaser may have bought payment card data 30 for many payment cards from a particular payment card institution based on bank number (or BIN) because it is known that the particular payment card institution (i.e., the "bank") does not have good fraud prevention resources (i.e., the bank has a history of not being quick enough to block transactions, the bank is unlikely to pursue the fraudster, etc.). As another example, a purchaser may have bought payment card data 30 for many payment cards 34 based on a zip code or other address information because the purchase plans to make in store purchases in a particular geographical location. As yet another example, a purchaser may have bought payment card data 30 for many payment cards 34 based age of the card owner. Other purchase trends are detectable such as cards 34 from the same payment card organization or company, from the same security breach, from the store front, etc.

Based on the identified trends, the payment card security server 24 provides sub-scores to each compromised payment card 30 in its records. Each sub-score is based on a strength of correlation with a particular identified trend. The payment card security server 24 then tallies or sums the sub-scores to generate overall scores for each compromised payment card 34. Such overall scores indicate measures of the likelihood that the compromised payment cards 34 will be used for fraud.

The payment card security server 24 then outputs compromised payment card risk assessment reports 42 to the payment card organizations 26. Each assessment report 42 includes a set of entries having (i) compromised payment card data 30 for respective compromised payment cards 34 and (ii) scores for the respective compromised payment cards 34. As a result, each payment card organization 26 can effectively direct remedial resources to the highest scored (i.e., ranked) compromised payment cards 34. Further details will now be provided with reference to FIG. 2.

Figure 2:
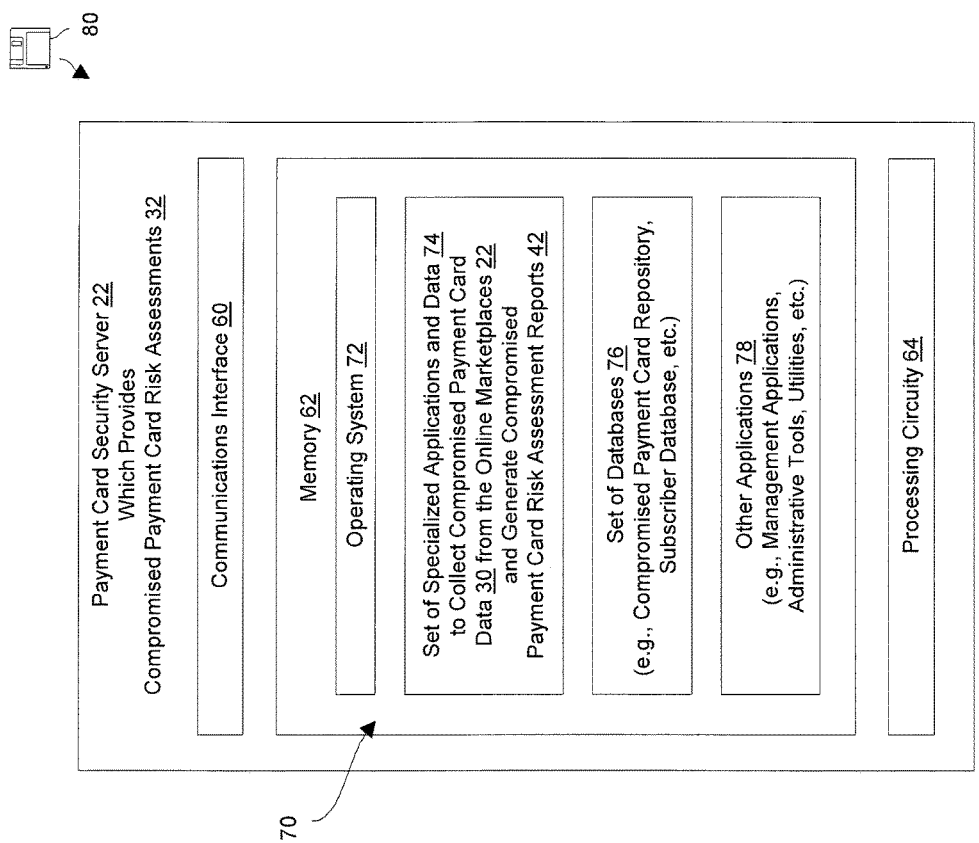
FIG. 2 is a block diagram of an electronic apparatus of the electronic environment which is constructed and arranged to provide a compromised payment card risk assessment.

FIG. 2 shows particular details of the payment card security server 24 (also see FIG. 1). The payment card security server 24 includes a communications interface 60, memory 62, and processing circuitry 64.

The communications interface 60 is constructed and arranged to connect the payment card security server 24 to the communications medium 28 to enable communications with other components of the electronic environment 20 (FIG. 1). Such communications may be IP-based, cellular-based, cable-based, fiber-optic based, wireless, combinations thereof, and so on. Accordingly, the communications interface 60 enables the payment card security server 24 to robustly and reliably communicate with external devices such as the organizations 26 which process payment card transactions.

The memory 62 is intended to represent both volatile storage (e.g., DRAM, SRAM, etc.) and non-volatile storage (e.g., flash memory, magnetic memory, etc.). The memory 62 stores a variety of software constructs 70 including an operating system 72 to manage resources of the payment card security server 24, a set of specialized applications and data 74 to communicate with the online marketplaces 22 and to provide the assessment reports 42, a set of databases 76 (e.g., a repository of compromised payment card data, a subscriber database, a known online marketplace database, etc.) and other applications 78 (e.g., management applications, administrative tools, utilities, other user level applications, and so on).

The processing circuitry 64 is constructed and arranged to operate in accordance with the various software constructs 70 stored in the memory 62. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the payment card security server 24. In particular, the computer program product 80 has a non-transitory (or non-volatile) computer readable medium which stores a set of instructions which controls one or more operations of the payment card security server 24. Examples of suitable computer readable storage media include tangible articles of manufacture and apparatus which store instructions in a non-volatile manner such as CD-ROM, flash memory, disk memory, tape memory, and the like.

During operation, the processing circuitry 64 executes code of the set of specialized applications and data 74 to form specialized control circuitry which provides compromised payment card assessments 32. In particular, the control circuitry collects compromised payment card data 30 from the online marketplaces 22 and stores that compromised payment card data 30 in a payment card data repository of the set of databases 76. Additionally, the control circuitry evaluates the compromised payment card data 30 in the repository to derive scores for individual compromised payment cards 34.

The control circuitry then delivers the compromised payment card data 30 and scores to the payment card organizations 26 (e.g., subscribers) to enable the payment card organizations 26 to prioritize their response/mitigation efforts. In particular, to a first subscribing organization 26, the control circuitry sends a payment card risk assessment report 42 containing assessments of payment cards 34 handled by the first subscribing organization 26. Likewise, to a second subscribing organization 26, the control circuitry sends another payment card risk assessment report 42 containing assessments of payment cards 34 handled by the second subscribing organization 26, and so on.

Additionally, it should be understood that the processing circuitry 64 can execute the other applications 78 to perform additional useful work. For example, an administrator can run one or more user level applications to update the payment card security server 24 with knowledge of newly discovered online marketplaces 22 to monitor. Additionally, the administrator can update algorithms/rules/policies/etc. which are used to identify trends in compromised payment card purchases, calculate sub-scores based on correlations with the identified trends, and so on. Further details will now be provided with reference to FIG. 3.

FIG. 3 shows an example view of an online store front which sells compromised payment cards 34 (also see the online marketplaces 22 in FIG. 1). The processing circuitry 64 of the payment card security server 24 executes a browser application 100 which navigates to each online marketplace 22 to collect compromised payment card data 30 (also see the specialized applications and data 74 in FIG. 2). In particular, the browser application 100 routinely navigates to the web pages 102 of the online marketplaces 22 which offer for sale compromised payment card data 30 corresponding to the compromised payment cards 34. The payment card security server 24 gathers as much compromised payment card data 30 as possible (e.g., via crawling and scraping the marketplace webpages 102) and stores this data 30 in a compromised payment card data repository (also see the databases 76 in FIG. 2).

As shown by way of example in FIG. 3, each item 104 of compromised payment card data 30 exposes part of the payment card number for a particular payment card 34 (e.g., the bank number which identifies a particular payment card organization), an expiration date, part of the card owner's name, a zip code, an acquisition date, a social security number of the card owner if available, a date of birth of the card owner if available, and perhaps other information (e.g., a store that the payment card 34 was used at, a source of the payment card data 30, a credit card company name, etc.). Each compromised payment card data item 104 further includes a cost to purchase that item 104 which can be based on the age of the item 104, the source of the item 104 (e.g., a particular corporate breach), how much confidential information is available, and so on.

Once a customer buys a compromised payment card data item 104 from the store front, the store front removes that compromised payment card data item 104 from the store front. Accordingly, another customer is not able to buy the same item 104. Further details will now be provided with reference to FIG. 4.

Figure 4:
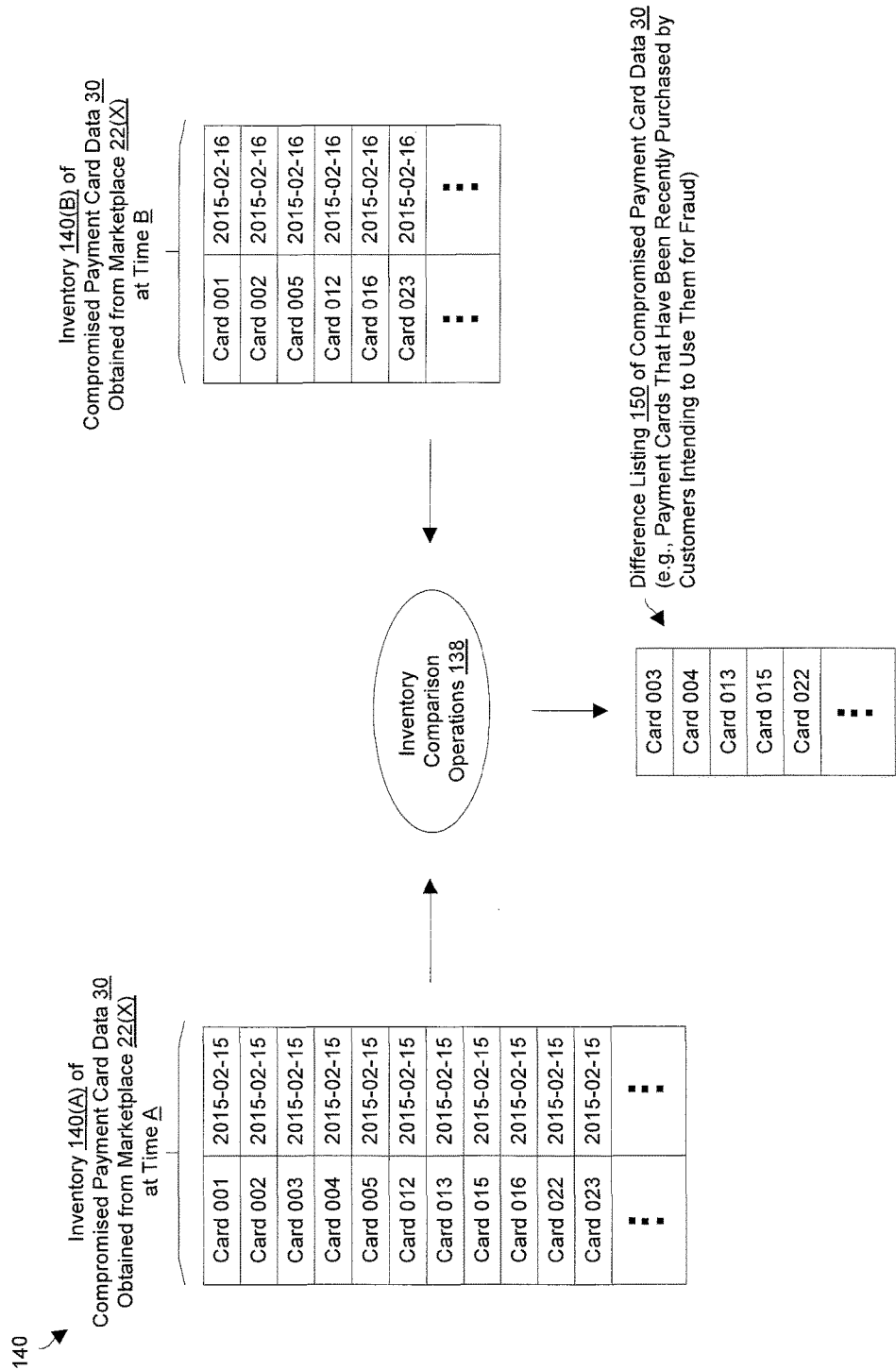
FIG. 4 is a diagram illustrating a comparison operation which is performed by the electronic apparatus of FIG. 2.

FIG. 4 shows how the payment card security server 24 identifies compromised payment cards 34 which will be imminently used for fraud. In particular, the payment card security server 24 performs a set of inventor comparison operations 138 which routinely compares different inventories 140 of compromised payment card data 30 that have been collected over time to determine which compromised payment cards 34 have been sold. The purchaser is likely to use the purchased compromised payment cards 34 for fraud in the near future.

As shown in FIG. 4, the payment card security server 24 evaluates a first inventory 140(A) of compromised payment card data 30 which was collected from online marketplace 22(X) at time A against a second inventory 140(B) of compromised payment card data 30 which was collected from online marketplace 22(X) at time B. Time B occurs a short time after time A (e.g., one hour later, half a day later, one day later, two days later, etc.). Even though FIG. 4 shows each item of compromised payment card data 30 has a number for simplicity (e.g., "Card 001", "Card 002", etc.), it should be understood that the items of compromised payment card data 30 in each inventory 140 includes respective compromised payment card data 30 that was collected from scraping/crawling through the online marketplace 22(X) (also see FIG. 3). Such data 30 uniquely identifies each compromised payment card 34.

Based on a comparison of the inventories 140, the payment card security server 24 outputs a difference listing 150 which includes compromised payment card data 30 which appeared in the inventory 140(A) but no longer appears in the inventory 140(B). Accordingly, the difference listing 150 is essentially a list of compromised payment cards 34 which have been purchased from the online marketplace 140(X).

Next, the payment card security server 24 identifies purchase trends from the difference listing 150. In examples provided earlier, recall that a purchaser may have bought payment card data 30 for many payment cards 34 from a particular payment card institution based on bank number because it is known that the particular payment card institution (i.e., "bank") does not have good fraud prevention resources (i.e., the bank has a history of not being quick enough to block transactions, the bank is unlikely to pursue the fraudster, etc.). Additionally, a purchaser may have bought payment card data 30 for many payment cards 34 based on a zip code or other address information because the purchase plans to make in store purchases in a particular geographical location. Furthermore, a purchaser may have bought payment card data 30 for many payment cards 34 based age of the card owner, and so on. Further details will now be provided with reference to FIG. 5.

Figure 5:
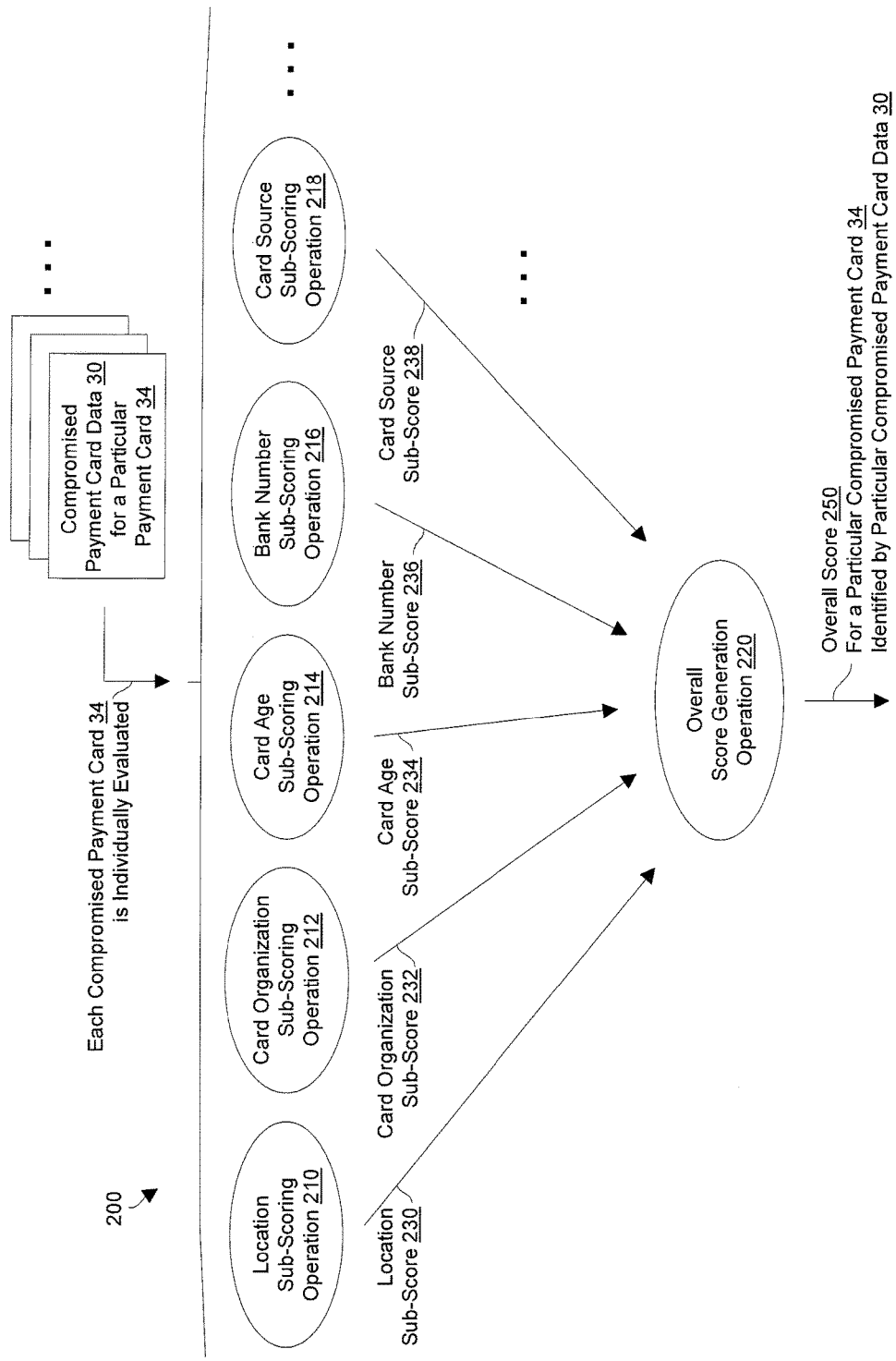
FIG. 5 is a diagram illustrate how overall assessment scores are derived from trend sub-scores.

FIG. 5 illustrates how the payment card security server 24 derives a score for each compromised payment card 34 by performing a set of scoring operations 200. First, based on the identified trends, the payment card security server 24 performs sub-scoring operations 210, 212, 214, 216, 218, . . . , and then an overall score generation operation 220.

The sub-scoring operations 210, 212, 214, 216, 218, . . . provide sub-scores 230, 232, 234, 236, 238, . . . for each compromised payment card 34 in its records. Each sub-score 230, 232, 234, 236, 238, . . . is based on a strength of correlation of a current compromised payment card 34 under evaluation and a particular identified trend. By way of example, the set of scoring operations 200 includes a location sub-scoring operation 210, a card organization sub-scoring operation 212, a card age sub-scoring operation 214, a bank number sub-scoring operation 216, and a card source sub-scoring operation 218.

The location sub-scoring operation 210 provides a location sub-score 230 for a particular compromised payment card 34 based on a correlation strength between (i) a location identified by the compromised payment card data 30 for that card 34 and (ii) any location trend identified in a list of recently purchased compromised payment cards 34 (see the difference listing 150 in FIG. 4). If the correlation strength is high (e.g., the location for that card 34 is the same as the location of many recently purchased cards 34 on the difference listing 150), the location sub-scoring operation 210 provides a relatively high numerical value for the location sub-score 230 for that card 34. On the other hand, if the correlation strength is low (e.g., the location for that card 34 is not the same as the location of many recently purchased cards 34 on the difference listing 150), the location sub-scoring operation 210 provides a relatively low numerical value for the location sub-score 230 for that card 34.

Similarly, the card organization sub-scoring operation 212 provides a card organization sub-score 230 for a particular compromised payment card 34 based on a correlation strength between (i) a card organization identified by the compromised payment card data 30 for that card 34 (e.g., Mastercard®, Visa®, Amex®, etc.) and (ii) any card organization trend identified in a list of recently purchased compromised payment cards 34 (see the difference listing 150 in FIG. 4). If the correlation strength is high (e.g., the card organization for that card 34 is the same as the card organization of many recently purchased cards 34 on the difference listing 150), the card organization sub-scoring operation 212 provides a relatively high numerical value for the card organization sub-score 232 for that card 34. On the other hand, if the correlation strength is low (e.g., the card organization for that card 34 is not the same as the card organization of many recently purchased cards 34 on the difference listing 150), the card organization sub-scoring operation 212 provides a relatively low numerical value for the card organization sub-score 232 for that card 34.

Likewise, the card age sub-scoring operation 214 provides a card age sub-score 234 for a particular compromised payment card 34 based on a correlation strength between (i) a card age identified by the compromised payment card data 30 for that card 34 and (ii) any card age trend identified in a list of recently purchased compromised payment cards 34. If the correlation strength is high (e.g., the card age for that card 34 is close to the card age of many recently purchased cards 34 on the difference listing 150), the card age sub-scoring operation 214 provides a relatively high numerical value for the card organization sub-score 234 for that card 34. On the other hand, if the correlation strength is low (e.g., the card age for that card 34 is not close to the card age of many recently purchased cards 34 on the difference listing 150), the card age sub-scoring operation 214 provides a relatively low numerical value for the card age sub-score 234 for that card 34.

Additionally, the bank number sub-scoring operation 216 provides a bank number sub-score 236 for a particular compromised payment card 34 based on a correlation strength between (i) a bank number identified by the compromised payment card data 30 for that card 34 and (ii) any card bank number trend identified in a list of recently purchased compromised payment cards 34. If the correlation strength is high (e.g., the bank number for that card 34 is the same as the bank number of many recently purchased cards 34 on the difference listing 150), the bank number sub-scoring operation 216 provides a relatively high numerical value for the card organization sub-score 236 for that card 34. On the other hand, if the correlation strength is low (e.g., the bank number for that card 34 is not the same as the bank number of many recently purchased cards 34 on the difference listing 150), the bank number sub-scoring operation 216 provides a relatively low numerical value for the bank number sub-score 236 for that card 34.

Furthermore, the card source sub-scoring operation 216 provides a card source sub-score 236 for a particular compromised payment card 34 based on a correlation strength between (i) a card source identified by the compromised payment card data 30 for that card 34 (e.g., the particular malicious entity that stole the payment card data 30, a particular corporate breach, etc.) and (ii) any card source trend identified in a list of recently purchased compromised payment cards 34. If the correlation strength is high (e.g., the card source for that card 34 is the same as the card source of many recently purchased cards 34 on the difference listing 150), the card source sub-scoring operation 216 provides a relatively high numerical value for the card source sub-score 236 for that card 34. On the other hand, if the correlation strength is low (e.g., the card source for that card 34 is not the same as the card source of many recently purchased cards 34 on the difference listing 150), the card source sub-scoring operation 216 provides a relatively low numerical value for the card source sub-score 236 for that card 34, and so on.

After the payment card security server 24 generates sub-scores 230, 232, 234, 236, 238, . . . for a particular compromised payment card 34, the payment card security server 24 performs an overall score generation operation 220 to tally or sum the sub-scores 230, 232, 234, 236, 238, . . . to generate an overall score 250 for that compromised payment card 34. This overall score 250 indicate a numerical measure of the likelihood that the compromised payment card 34 will be used for fraud. In particular, a higher score on an assessment report 42 indicates a higher likelihood that the compromised payment card 34 will be used for fraud, and a lower score on the assessment report 42 indicates a lower likelihood that the compromised payment card 34 will be used for fraud.

It should be understood that other scoring factors are suitable for use as well as those provided above. For example, the compromised payment cards 34 can be further scored based on whether a social security number is available, the amount of credit available on the particular card 34, the amount of confidential data available, the amount of time that has passed since the compromised payment card 34 was purchased from an online marketplace 22, the particular online marketplace 22 that sold the card 34, and so on. In some arrangements, the location sub-scores 230 and/or the overall scores 250 are normalized (e.g., scaled to fall within a range of 0 to 100) to prevent unintentional skewing of a particular sub-score type over the other sub-score types. Further details will now be provided with reference to FIG. 6.

FIG. 6 is an example compromised payment card assessment report 280 which is provided by the payment card security server 24 (also see arrow 42 in FIG. 1). The compromised payment card assessment report 280 includes entries 282(1), 282(2), . . . (collectively, entries 282) which correspond to respective payment cards 34.

For a financial institution that supports certain payment cards 34, the compromised payment card assessment report 280 received by that financial institution from the server 24 includes compromised payment card data 30 and scores for only the certain payment cards 34 supported by that financial institution. Likewise, another financial institution receives a compromised payment card assessment report 280 which includes compromised payment card data 30 and scores for only the payment cards 34 supported by that other financial institution, and so on.

Each entry 282 includes a set of fields 290 such as a card identifier field 292, a compromised payment card data field 294, and an overall score field 296. The card identifier field 292 contains a card identifier or ID which uniquely identifies the payment card 34 to the payment card security server 24. The compromised payment card data field 294 contains the compromised payment card data 30 that was offered for sale on the online marketplace 22 to enable the particular payment card organization 26 receiving the compromised payment card assessment report 280 to accurately identify the particular payment card owner for response/mitigation. The overall score field 296 contains the overall score 250 which the payment card security server 24 generated for that payment card 34.

In some arrangements, the entries 282 of the compromised payment card assessment report 280 are already sorted in order of score. In other arrangements, the entries 282 are arranged in some other manner, e.g., sorted based on card number, acquisition date, etc. Further details will now be provided with reference to FIG. 7.

Figure 7:
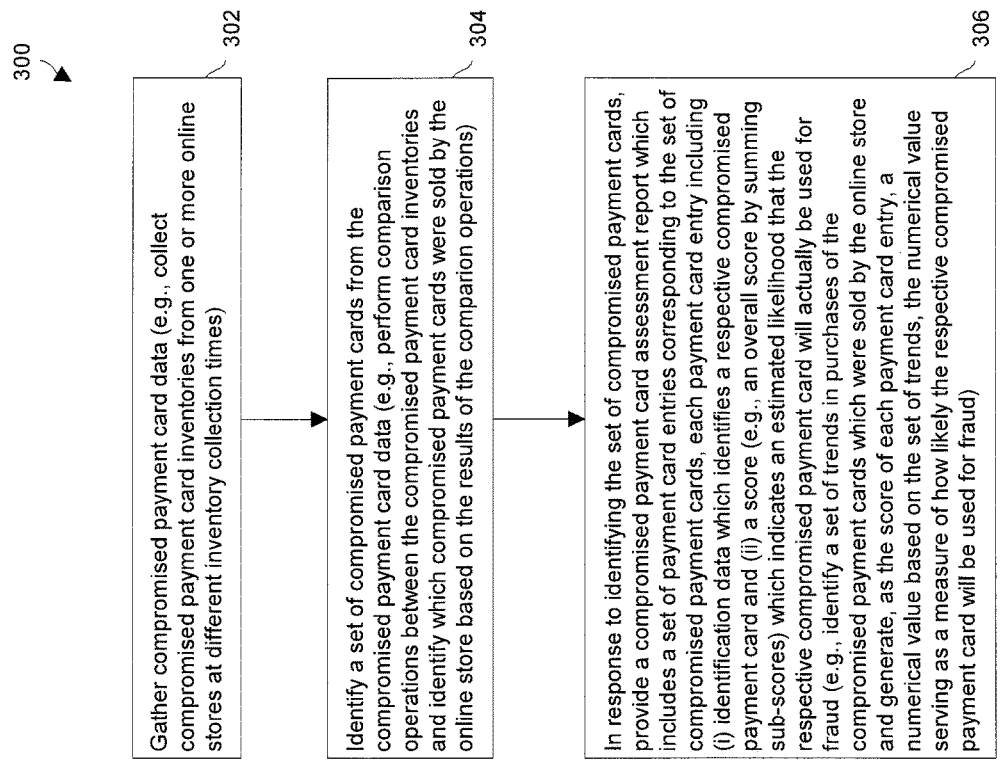
FIG. 7 is a flowchart of a procedure which is performed by the electronic apparatus of FIG. 2.

FIG. 7 is a flowchart of a procedure 300 which is performed by the payment card security server 24 to provide risk assessments to compromised payment cards 34. At 302, the payment card security server 24 gathers compromised payment card data 30 from various online marketplaces 22 that sell compromised payment card data 30. In particular, the payment card security server 24 collects compromised payment card inventories 140 from an online marketplace 22(X) at different collection times.

At 304, the payment card security server 24 identifies a set of compromised payment cards 202 from the compromised payment card data 30. In particular, the payment card security server 24 performs comparison operations between the compromised payment card inventories 140 which were collected from the online marketplace 22(X) at the different times and identifies which compromised payment cards 34 were sold by the online marketplace 22(X) based on results of the comparison operations.

At 306, the payment card security server 24 provides, in response to identifying the set of compromised payment cards 34, a compromised payment card assessment report 280 which includes a set of payment card entries 282 corresponding to the set of compromised payment cards 34 (also see FIG. 6). Each payment card entry 282 includes (i) identification data which identifies a respective compromised payment card 34 and (ii) a score which indicates an estimated likelihood that the respective compromised payment card 34 will actually be used for fraud. Here, the payment card security server 24 identifies a set of trends in purchases of the compromised payment cards 34 which were sold by the online marketplace 22(X) and generates, as the score of each payment card entry included in the compromised payment card assessment report 280, a numerical value based on the set of trends in the purchases of the compromised payment cards 34. The numerical value serves as a measure of how likely the respective compromised payment card 34 identified by the identification data of that payment card entry will be used for fraud.

At this point, it should be understood that the gathering efforts performed at one online marketplace 22 may result in multiple reports 42, 280 sent to multiple financial institutions. For example, the payment card security server 24 may discover that a particular online marketplace 22(X) sells a first set of compromised payment cards 34 from a first organization 26(1), and then send a first assessment report 42, 280 to the first organization 26(1) containing compromised payment card data 30 and scores for the compromised payment cards 34 belonging to that first organization 26(1). Similarly, the payment card security server 24 may discover that the same online marketplace 22(X) sells a second set of compromised payment cards 34 from a second organization 26(2), and then send a second assessment report 42, 280 to the second organization 26(2) containing compromised payment card data 30 and scores for the compromised payment cards 34 belonging to that second organization 26(2), and so on.

Furthermore, it should be understood that the assessment report 42, 280 that the payment card security server 24 sends to a particular organization 26 may be derived from accessing multiple online marketplaces 22. For example, the payment card security server 24 may identify and score a first set of compromised payment cards 34 which were sold by a first online marketplace 22(1). Additionally, the payment card security server 24 may identify and score a second set of compromised payment cards 34 which were sold by a second online marketplace 22(2), and so on. Accordingly, the payment card security server 24 may combine these results into a single assessment report 42, 280 which it then sends to the particular organization 26.

As described above, improved techniques are directed to providing risk assessments to compromised payment cards 34. The risk assessments (e.g., risk scores) provide measures of how likely the compromised payment cards 34 will be used for fraud. Such risk assessments may be based on monitoring compromised payment card offerings at malicious payment card marketplaces 22 (e.g., online store fronts which sell stolen payment card data). Accordingly, banks (or other payment card processing companies) may be able to rank the compromised payment cards 34 based on the risk assessments, and take action on the highest ranked compromised payment cards 34. As a result, a bank does to not need to take a wait-and-see approach if the bank does not have enough resources to proactively replace all of the compromised payment cards 34. Rather, the bank is able to channel its attention and resources to the compromised payment cards 34 which are deemed riskiest.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the payment card security server 24 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one should appreciate that the disclosed improvements involve analytical techniques to assess the risk of fraud on compromised payment cards. In particular, recently, the cybercrime marketplace has matured to a point where attacks (such as phishing or distributed denial of service attacks) are offered as a service and the compromised data resulting from these attacks is available as a commodity. Compromised payment card information is no different and can be seen in the hundreds of "Credit Card Stores" (or "CC Stores") that have developed to support the selling of credit cards. At any given moment hundreds of thousands—if not millions—of cards are offered for sale in the cybercrime marketplace for as low as one or two US Dollars. The stores' "stock" of credit cards is constantly replenished, sourced mainly from large botnets or from point-of-sale compromises/breaches.

Traditional mitigation may have involved just sending lists of the identified compromised credit cards to the targeted financial institutions. However, considering the growing number of compromised credit cards in circulation, there is a need to provide a "risk score" against each compromised credit card, i.e., what is the probability of a compromised credit card actually being used for fraud. The disclosed techniques allow the response/mitigation (by the financial institution) to be prioritized.

One should further appreciate that some of the disclosed techniques are directed to gathering data relating to compromised cards and analyzing the data to ascertain the risk levels of fraud against a particular compromised card. The data to be gathered includes publicly available information that is posted on the aforementioned "CC stores" and may include, but is not limited to, the card's Bank Identification Number (BIN), the card holder's first name, the geographic area from which the card was stolen, the date of when it was stolen and more. Analyzing this data allows a monitoring system to assess the level of risk by examining information such as the "age" of the card (or how long it has been offered on the marketplace), availability of the card, number of stores the card appears on, etc.

Currently, conventional approaches involve simply providing the issuing financial institutions with datasets of the compromised card information. The institutions, basically, receive electronic lists of the cards that were identified in the marketplace and that are associated to their organization (based on BIN). In today's landscape, this means that institutions are receiving thousands of cards without a way to assess whether the card has a high or low risk of being used for fraud, which in turn hinders the mitigation prioritization (such as canceling the card, sending a new one to the victim, etc.)

However, with the risk factors in the disclosed improvements, financial response teams are able to prioritize their incident handling to first address the high-risk cards. Instead of looking at a list of thousands of payment cards, incident handlers will be able to "zoom in" on the cards with the highest risk of fraud and mitigate those on a prioritized basis.

In some arrangements, a process involves collecting, analyzing and reporting on the data. To this end, a scanner continuously monitors/scans (fraudulent) payment card stores. To the store, the scanner appears as a "normal" human shopper and methodically scans the entire public-facing website of the store gathering the available compromised payment card data. Additionally, the compromised payment card data may include, but not limited to, card's BIN, victims' first name, victims' date of birth, victims' social security number, information relating to the geography from which the card was compromised, and any other information the scanner can find that is associated to the card. The compromised payment card data is then stored in a trusted and secure database, and a risk engine accesses the database periodically to assess the risk for each compromised payment card, e.g., by analyzing and correlating the numerous data points collected in the compromised payment card data.

For example, suppose that a credit card is stolen by a botnet and is posted to a (criminal) credit card store. The credit card sits on the store front for several weeks until it is eventually removed from the store front because the credit card is purchased. The card information and a risk score are reported immediately to the financial institution for remediation. One should appreciated that, while the credit card was not purchased but still offered at the store front, the risk was low. During this low risk time, the credit card was reported to the financial institution with a low risk score. However, once the credit card data was purchased, the risk of fraud significantly increased, and so a new report to the financial institution provides the credit card data with a higher risk score.

Furthermore, it should be understood that the compromised payment cards 34 where described above as credit cards by way of example only. However, the compromised payment cards 34 may be cards other than credit cards. For example, the payment cards 34 may include charge cards, credit cards, debit cards, ATM (automated teller machine) cards, store-value cards, fleet cards, gasoline cards, banking cards, gift cards, and so on. Such modifications and enhancements are intended to belong to various embodiments of the disclosure.

What is claimed is:

1. A computer-implemented method of providing a compromised payment card risk assessment, the computer-implemented method comprising:
   gathering, by processing circuitry, compromised payment card data, the gathering of the compromised payment card data including automatically crawling content of a web page containing the compromised payment card data, and scraping the compromised payment card data from the web page, the web page being associated with an online store selling stolen payment card data;
   identifying, by the processing circuitry, a set of compromised payment cards from the compromised payment card data;
   in response to identifying the set of compromised payment cards, providing, by the processing circuitry, a compromised payment card assessment report that includes a set of payment card entries corresponding to the set of compromised payment cards, each payment card entry including (i) identification data that identifies a respective compromised payment card and (ii) a score that indicates an estimated likelihood that the respective compromised payment card will actually be used for fraud,
   wherein the gathering of the compromised payment card data includes automatically crawling the content of the web page to collect compromised payment card inventories from the online store at different collection times,
   wherein the identifying of the set of compromised payment cards from the compromised payment card data includes performing comparison operations between the compromised payment card inventories that were collected from the online store at the different times, and identifying which compromised payment cards were sold by the online store based on results of the comparison operations, and
   wherein the providing of the compromised payment card assessment report includes identifying a set of trends in purchases of the compromised payment cards that were sold by the online store, and generating, as the score of each payment card entry included in the compromised payment card assessment report, a numerical value based on the set of trends in the purchases of the compromised payment cards, the numerical value serving as a measure of how likely the respective compromised payment card identified by the identification data of that payment card entry will be used for fraud; and
   transmitting, over one or more networks, the compromised payment card assessment report to a card organization, the transmitting of the compromised payment card assessment report to the card organization causing contact to be established between the card organization and an owner of the respective compromised payment card to enable the respective compromised payment card to be replaced based on the numerical value of the score.

2. A computer-implemented method as in claim 1 wherein gathering the compromised payment card data includes:
   collecting (i) a first compromised payment card inventory from the online store at a first inventory collection time and (ii) a second compromised payment card inventory from the online store at a second inventory collection time, the second inventory collection time occurring after the first inventory collection time.

3. A computer-implemented method as in claim 2 wherein identifying the set of compromised payment cards from the compromised payment card data includes:
   performing comparison operations between the first compromised payment card inventory and the second compromised payment card inventory and identifying which compromised payment cards were sold by the online store based on results of the comparison operations.

4. A computer-implemented method as in claim 3 wherein providing the compromised payment card assessment report includes:
   identifying a location trend in purchases of the compromised payment cards which were sold by the online store, and
   generating a respective location sub-score for each payment card entry included in the compromised payment card assessment report, the respective location sub-score being based on a correlation strength between a location identified by the identification data of that payment card entry and the location trend identified in the purchases of the compromised payment cards which were sold by the online store.

5. A computer-implemented method as in claim 3 wherein providing the compromised payment card assessment report includes:
   identifying a card organization trend in purchases of the compromised payment cards which were sold by the online store, and
   generating a respective card organization sub-score for each payment card entry included in the compromised payment card assessment report, the respective card organization sub-score being based on a correlation strength between the card organization identified by the identification data of that payment card entry and the card organization trend identified in the purchases of the compromised payment cards which were sold by the online store.

6. A computer-implemented method as in claim 3 wherein providing the compromised payment card assessment report includes:
   identifying a card age trend in purchases of the compromised payment cards which were sold by the online store, and
   generating a respective card age sub-score for each payment card entry included in the compromised payment card assessment report, the respective card age sub-score being based on a correlation strength between a card age and the card age trend identified in the purchases of the compromised payment cards which were sold by the online store.

7. A computer-implemented method as in claim 3 wherein providing the compromised payment card assessment report includes:
identifying a bank number trend in purchases of the compromised payment cards which were sold by the online store, and
generating a respective bank number sub-score for each payment card entry included in the compromised payment card assessment report, the respective card bank number sub-score being based on a correlation strength between a bank number identified by the identification data of that payment card entry and the bank number trend identified in the purchases of the compromised payment cards which were sold by the online store.

8. A computer-implemented method as in claim 3 wherein providing the compromised payment card assessment report includes:
identifying a card source trend in purchases of the compromised payment cards which were sold by the online store, and
generating a respective card source sub-score for each payment card entry included in the compromised payment card assessment report, the respective card source sub-score being based on a correlation strength between a card source identified by the identification data of that payment card entry and the card source trend identified in the purchases of the compromised payment cards which were sold by the online store.

9. A computer-implemented method as in claim 3 wherein providing the compromised payment card assessment report includes:
identifying, in purchases of the compromised payment cards which were sold by the online store, a location trend, a card organization trend, a card age trend, a bank number trend, and a card source trend, and
generating a location sub-score, a card organization sub-score, a card age sub-score, a bank number sub-score, and a card source sub-score for each payment card entry included in the compromised payment card assessment report, and aggregating the sub-scores for each payment card entry to form, for that payment card entry, the score which indicates the estimated likelihood that the respective compromised payment card will actually be used for fraud.

10. An electronic apparatus, comprising:
a communications interface;
memory; and
control circuitry coupled to the communications interface and the memory, the memory storing instructions that, when carried out by the control circuitry, cause the control circuitry to:
gather compromised payment card data through the communications interface, including automatically crawl content of a web page containing the compromised payment card data, and scrape the compromised payment card data from the web page, the web page being associated with an online store selling stolen payment card data;
identify a set of compromised payment cards from the compromised payment card data;
in response to identifying the set of compromised payment cards, provide a compromised payment card assessment report that includes a set of payment card entries corresponding to the set of compromised payment cards, each payment card entry including (i) identification data that identifies a respective compromised payment card and (ii) a score that indicates an estimated likelihood that the respective compromised payment card will actually be used for fraud,
wherein the control circuitry, when gathering the compromised payment card data, is constructed and arranged to automatically crawl the content of the web page to collect compromised payment card inventories from the online store through the communications interface at different collection times,
wherein the control circuitry, when identifying the set of compromised payment cards from the compromised payment card data, is constructed and arranged to perform comparison operations between the compromised payment card inventories that were collected from the online store at the different times and identifying which compromised payment cards were sold by the online store based on results of the comparison operations, and
wherein the control circuitry, when providing the compromised payment card assessment report, is constructed and arranged to identify a set of trends in purchases of the compromised payment cards that were sold by the online store, and generate, as the score of each payment card entry included in the compromised payment card assessment report, a numerical value based on the set of trends in the purchases of the compromised payment cards, the numerical value serving as a measure of how likely the respective compromised payment card identified by the identification data of that payment card entry will be used for fraud; and
transmit, over one or more networks, the compromised payment card assessment report to a card organization, the transmitting of the compromised payment card assessment report to the card organization causing contact to be established between the card organization and an owner of the respective compromised payment card to enable the respective compromised payment card to be replaced based on the numerical value of the score.

11. A computer program product having a non-transitory computer readable medium which stores a set of instructions to provide a compromised payment card risk assessment, the set of instructions, when carried out by computerized circuitry, causing the computerized circuitry to perform a method of:
gathering compromised payment card data, the gathering of the compromised payment card data including automatically crawling content of a web page containing the compromised payment card data, and scraping the compromised payment card data from the web page, the web page being associated with an online store selling stolen payment card data;
identifying a set of compromised payment cards from the compromised payment card data;
in response to identifying the set of compromised payment cards, providing a compromised payment card assessment report which includes a set of payment card entries corresponding to the set of compromised payment cards, each payment card entry including (i) identification data which identifies a respective compromised payment card and (ii) a score which indicates an estimated likelihood that the respective compromised payment card will actually be used for fraud, wherein the gathering of the compromised payment card data includes automatically crawling the content of the web page to collect compromised payment card inventories from the online store at different collection times, wherein the identifying of the set of compromised payment cards from the compromised payment card data includes performing comparison operations between the compromised payment card inventories which were collected from the online store at the different times and identifying which compromised payment cards were sold by the online store based on results of the comparison operations, and wherein the providing of the compromised payment card assessment report includes identifying a set of trends in purchases of the compromised payment cards which were sold by the online store, and generating, as the score of each payment card entry included in the compromised payment card assessment report, a numerical value based on the set of trends in the purchases of the compromised payment cards, the numerical value serving as a measure of how likely the respective compromised payment card identified by the identification data of that payment card entry will be used for fraud; and transmitting, over one or more networks, the compromised payment card assessment report to a card organization, the transmitting of the compromised payment card assessment report to the card organization causing contact to be established between the card organization and an owner of the respective compromised payment card to enable the respective compromised payment card to be replaced based on the numerical value of the score.

12. A computer-implemented method as in claim 1 further comprising:

obtaining a rank of each of the compromised payment cards based on the numerical value associated with the score of the payment card entry; and in response to the transmitting of the compromised payment card assessment report to the card organization, causing a predetermined percentage of highest ranked compromised payment cards to be replaced with new payment cards, respectively.

* * * * *